United States Patent

Fuzzell

[11] 4,297,687

[45] Oct. 27, 1981

[54] LEAK DETECTION APPARATUS

[75] Inventor: Joe E. Fuzzell, Peoria, Ill.

[73] Assignee: Caterpillar Tractor Co., Peoria, Ill.

[21] Appl. No.: 130,488

[22] PCT Filed: Feb. 22, 1980

[86] PCT No.: PCT/US80/00180

§ 371 Date: Feb. 22, 1980

§ 102(e) Date: Feb. 22, 1980

[87] PCT Pub. No.: WO81/02484

PCT Pub. Date: Sep. 3, 1981

[51] Int. Cl.³ .............................. G08B 21/00
[52] U.S. Cl. ................... 340/626; 116/70;
    200/83 A; 200/83 L; 340/605; 340/614
[58] Field of Search ............. 340/626, 605, 614;
    200/83 A, 83 L; 116/70, 268; 73/46

[56] References Cited

U.S. PATENT DOCUMENTS

| 2,430,122 | 11/1947 | Grace, Jr. | 340/605 |
| 2,895,504 | 7/1959 | Lederer | 116/70 |
| 3,517,693 | 6/1970 | Dietz | 116/70 |
| 3,800,736 | 4/1974 | Krohn | 116/268 |
| 3,946,175 | 3/1976 | Sitabkhan | 340/626 |
| 3,997,887 | 12/1976 | Poynter | 340/626 |
| 4,055,844 | 10/1977 | Hornbostel, Jr. | 340/626 |
| 4,131,876 | 12/1978 | Dees, Sr. et al. | 200/83 A |

Primary Examiner—Glen R. Swann, III
Attorney, Agent, or Firm—Wegner, Stellman, McCord, Wiles & Wood

[57] ABSTRACT

A leak detection apparatus (18) is provided in a pressurized assembly (10) to signal a loss of pressure or vacuum downstream from a source of pressure or vacuum. A rod (60,160,260) is carried on a valve (62,162) and a diaphragm (38,138) which seals the source of pressure or vacuum from the system. A loss of pressure or vacuum downstream of the valve (62,162) and diaphragm (38,138) moves the rod (60,160,260) to a signalling position to alert an interested party that the system is lacking pressure or vacuum.

15 Claims, 3 Drawing Figures

U.S. Patent  Oct. 27, 1981  4,297,687
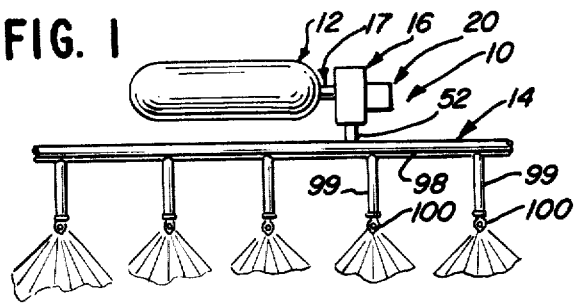
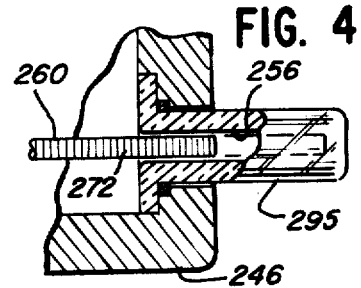
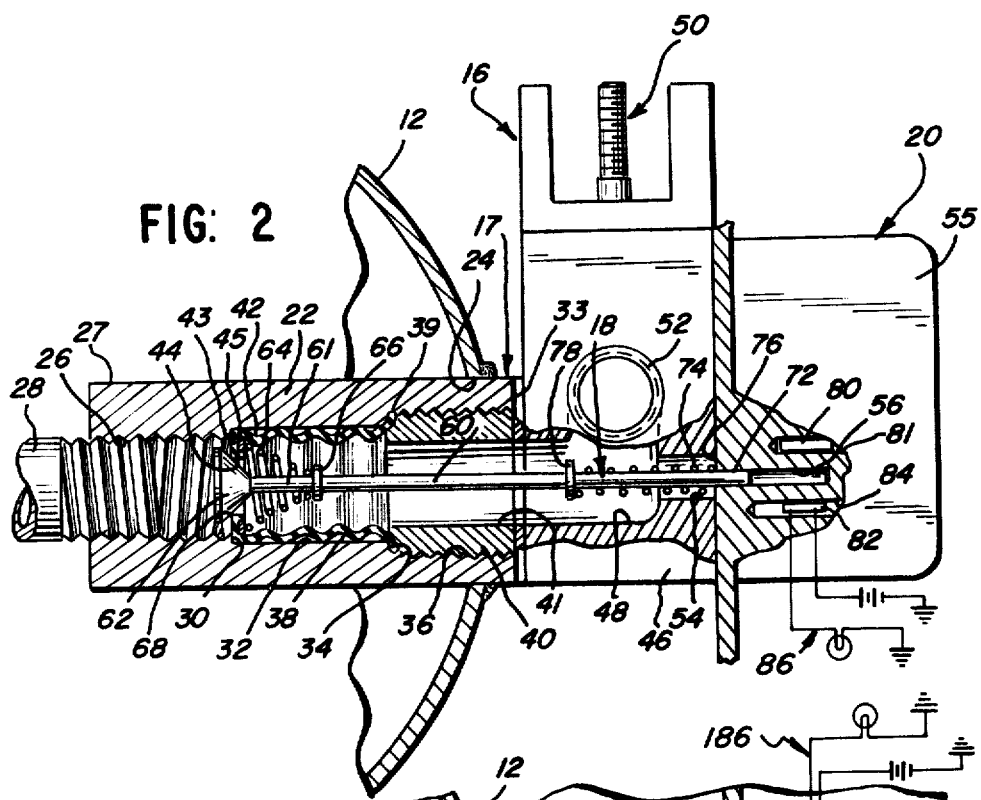
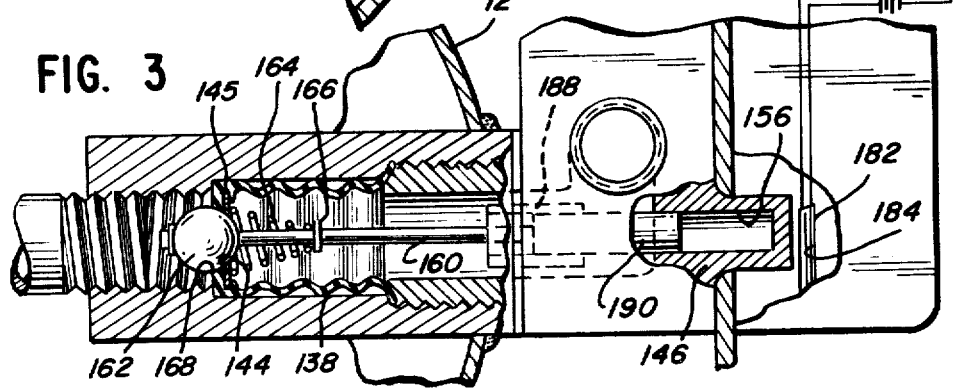

LEAK DETECTION APPARATUS

DESCRIPTION

1. Technical Field

This invention relates to a leak detection apparatus and, more particularly, to an apparatus for detecting a loss of pressure, either positive or negative, on a fluid in one portion of a system.

2. Background Art

There are many systems in operation that require a source of fluid under pressure or under vacuum, which source is connected to a distribution system for circulating the fluid to appropriate outlets where the fluid is used to perform some useful function. A typical apparatus would be a fire control system where the system is maintained under pressure so that opening one or more valves in the distribution system will discharge fire control fluids under pressure onto the appropriate area. Another such system would be in a hospital where the oxygen system is maintained under pressure so that the distribution system can be tapped as a source of oxygen for the patients in the various rooms.

The existing systems incorporate a source of fluid under pressure or under vacuum, which source is connected to the distribution system. The distribution system is likewise maintained under pressure or under vacuum and will have many couplings and fittings between the source and the outlets of the distribution system. Many of the systems are subject to vibrations and misuse, such as from frequent connections to and disconnections from the outlets, resulting in leaking of the fluid under pressure or under vacuum even to the point that upon demand, no fluid under pressure or under vacuum remains in the system for use. The lack of fluid can result in a fire destroying a piece of equipment or a building or of a patient being left without oxygen. In each case, when the demand was made on the apparatus for the desired fluid, there was no indication that the fluid was not available in the system with the resulting possible catastrophic effects.

The present invention is directed to overcoming one or more of the problems as set forth above.

DISCLOSURE OF THE INVENTION

In one apsect of the present invention, a leak detection apparatus is provided for a pressurized system, which system has both a source of fluid under pressure or under vacuum and a distribution system having outlets for said fluid with the source of fluid and the distribution system being maintained under either substantially uniform pressure or substantially uniform vacuum. The apparatus comprises means for sealing the source of pressurized fluid from the distribution system with a rod means connected to a movable portion of the sealing means and being positioned so that movement thereof in one direction will signal that the pressure or vacuum on the distribution side of the system has been lost through leakage, usage, or the like. The signal may be a visual indication or may entail the rod means making or breaking a circuit so as to set off an audible or visual signal at an appropriate control center. The system includes provision for the valve means to open to permit the fluid from the source to flow into the distribution system if the pressure differential across the sealing means exceeds a predetermined amount.

BRIEF DESCRIPTION OF DRAWINGS

FIG. 1 illustrates a pressurized system showing a source of fluid under pressure or under vacuum, a distribution system and the improved leak detection apparatus therebetween;

FIG. 2 is an enlarged fragmentary, sectional view showing the improved leak detection apparatus;

FIG. 3 is a view similar to FIG. 2 only showing a modified form of leak detection apparatus; and FIG. 4 shows a modified form of the invention wherein the signal revealing the pressure differential is visual.

BEST MODE FOR CARRYING OUT THE INVENTION

Referring to FIG. 1 of the drawings, a pressurized assembly 10 is illustrated and includes a tank or container 12 containing a source of fluid under pressure or under vacuum and a fluid distribution system 14. A fill valve 16 is mounted in the system between the tank 12 and the distribution system 14, which fill valve 16 is used to recharge either or both the tank 12 and/or the distribution system 14. Mounted in the fill valve 16 and in a dispensing outlet 17 of the tank 12 is an improved leak detection apparatus 18 having an indicator 20 as is best illustrated in detail in FIG. 2.

The source of fluid is maintained under pressure or under vacuum in the tank 12 which, in a portable system, as shown in FIGS. 1 and 2 for instance, could be cylindrical in shape. The dispensing outlet 17 includes a housing 22 secured in an aperture 24 at one end of the tank 12. The housing 22 has internal threads 26 in one end portion 27 thereof for receiving the threaded end of a tube 28 which extends into the tank 12 for communicating with the fluid being dispensed from the tank. The threads 26 in the end portion 27 terminate coextensive with an outwardly extending shoulder 30 which defines one end of a cylindrical cavity 32 in the midportion of the housing 22. The outer or other end portion 33 of the housing 22 has internal threads 36, which threads terminate in an inwardly extending shoulder 34 which is coextensive with the other end of the cavity 32.

A bellows-like diaphragm 38 is nested in the cylindrical cavity 32 and has one end portion 39 flared outwardly and seated on the shoulder 34 against which it is trapped by one end of an apertured plug 40 threaded into the threads 36. The plug 40 has an axially extending aperture 41 communicating with the inside of the bellows-like diaphragm 38. The other end portion 42 of the bellows-like diaphragm 38 has a radially inwardly directed flange 43 which defines an opening 44 having a diameter less than the internal diameter of the bellows-like diaphragm 38 and less than the diameter of the threads 26. A ring 45 bears against the inner surface of the flange 43 to provide a backing for the flange 43 of the bellows-like diaphragm 38.

The fill valve 16 has a body portion 46 sealed against the housing 22 of the outlet 17, using an appropriate well-known apparatus, and has a passage 48 which communicates with the aperture 41 in the plug 40. Passage 48 communicates with a conventional filling coupling 50 which is used to charge the system with fluid, either under pressure or under vacuum. The passage 48 also communicates with a nipple 52 which is connected to the distribution system 14. A second passage 54 is formed in the body 46 of the fill valve 16 in axial alignment with a branch of the passage 48 and with the aperture 41 in the plug 40. The indicator 20 includes a block 55 sealed against the body 46 and has a reduced diameter bore 56 in axial alignment with the passages 54,48 and with aperture 41.

The leak detection apparatus 18, as shown in FIG. 2, includes a rod 60 which has one end portion 61 extending axially through the diaphragm 38 and has a valve element 62, which is shown in a cone-shape and is fixed on said end portion 61. A compression spring 64 encircles the end portion 61 of the rod 60 and has one end bearing against the ring 45 in the diaphragm 38 and has the other end bearing against a collar 66 secured to the rod 60. The compression spring 64 will urge the valve element 62 against a valve seat 68 formed by the edge of the opening 44 in the diaphragm 38 so as to seal the contents of the tank 12. The rod 60 extends from the valve element 62 through the inside of the diaphragm 38, the aperture 41, passages 48,54 and has an end portion 72, remote from the valve element 62, slidably extending into the bore 56 in the block 55. A spring 74 surrounds the end portion 72 and bears on a shoulder 76 surrounding the entrance of the bore 56 and bears, at the other end, against a collar 78 secured to the rod 60. The spring 74 has some compressive force which urges the rod 60, valve 62 and the end portion 42 of the diaphragm 38 toward the tube 28 to seat the flange 43 of the diaphragm 38 against the shoulder 30. In this position, the bellow of the diaphragm 38 will be extended.

Mounted in the block 55 of the indicator 20 is a magnet 80 which is seated in a cavity 81 located diametrically opposite to a reed switch 82 seated in a cavity 84. The reed switch 82 is connected in a circuit to a warning device 86, such as a red light or a horn on a control panel, instrument panel, or the like. The magnet 80 holds the reed switch 82 closed to provide a signal to an electronic circuit to keep the warning signal deactivated. When the end portion 72 of the rod 60 moves into the bore 56 between the magnet 80 and reed switch 82, it will break the circuit which will activate the warning signal.

The tank 12 contains a supply of fluid under positive or negative pressure. The distribution system 14 is, likewise, charged with fluid under the same positive or negative pressure. A modest pressure differential is permitted between the fluid in the tank 12 and the fluid in the aperture 41 which will be compensated for in the leak detector apparatus 18 by the spring 74 which holds the diaphragm 38 extended against said modest pressure differential.

The modification shown in FIG. 3 shows a different spherical ball-type valve element 162 secured on the end portion of the rod 160 and has a spring 164 bearing on a ring 145 and against a collar 166 on the rod 160 to urge the valve element 162 against the valve seat 168 formed in the opening 144 in the bellows diaphragm 138. The other end of the rod 160 is connected to a coupling 188, which coupling supports an axially extending magnet 190. The extended end portion of the magnet 190 slidably engages in a bore 156 in the body 146. A reed or Hall switch 182 is mounted in a cavity 184 in close proximity to the bore 156 in the path of movement of the magnet 190. Movement of the rod 160 will move the magnet 190 until it approaches close enough to the reed or Hall switch 182 to establish a circuit to the warning device 186 to warn the operator of the problem.

Another modification of the leak detector is shown in FIG. 4 wherein either the diaphragm 38,138 and valve 62,162 of FIGS. 2 or 3, are used and wherein the end portion 272 of the rod 260 slides in a glass or plastic thimble 295, which thimble 295 is sealingly secured in the wall of the body 246 with the outer closed end of the thimble 295 extending outwardly from the body 246. The end portion 272 of the rod 260 is distinctively marked with a legend, pattern, color, or other readily visible marking so that upon movement of the end portion 272 of the rod 260 into the bore 256 of the thimble 295, the appearance of the thimble 295 will immediately be altered sufficiently to visibly warn an operator of the problem.

Industrial Applicability

The pressurized assembly 10 incorporates a fluid under positive or negative pressure in a tank 12 with the distribution system 14 having, for instance, a main trunk 98 and branches 99 thereof with closed nozzles or valves 100 in the branches thereof. When the assembly 10 is installed, the trunk 98 and branches 99 of the distribution system 14 are charged with fluid under pressure (positive or negative). Returning to the embodiment of FIG. 2, by way of example, the amount of pressure on the fluid in the distribution system 14 is substantially equal to the pressure of the fluid in the tank 12 so that the diaphragm 38 is extended and the end portion 72 of the rod 60 is not influencing the switch 82 to the signal.

If any of the nozzles or valves 100 are opened, or if any of the nozzles, valves or couplings in the distribution system 14 leak, the fluid in the distribution system 14 will lose pressure so that a pressure differential will develop between the inside of the tank 12 and the distribution system 14. As the pressure differential approaches or exceeds the force of the spring 74, the diaphragm 38 will collapse under the pressure of the fluid in the tank 12 which will move the rod 60 to the right to advance the end portion 72 in the bore 56 until it interrupts the circuit between the magnet 80 and the reed switch 82. The reed switch 82 will open which will energize the warning signal or light to warn the operator that the distribution system 14 is operating on reduced pressure. As the pressure differential increases, the pressure of the fluid in the tank 12 will bear against the flange 43 of the diaphragm 38 so that when the rod 60 bottoms in the bore 56, the diaphragm 38 will continue to collapse against the spring 64, opening an area between the valve 62 and the valve seat 68 to permit the fluid under pressure in the tank 12 to enter the distribution system 14. Upon discharging, the system is brought to an equilibrium point sufficient to permit the spring 74, spring 64 and the pressure in the distribution system 14 to force the diaphragm 38 to expand to the left and reseat the valve 62 on the valve seat 68. The end portion 72 of the rod 60 will move out of the path of the magnet 80 and the reed switch 82, permitting the reed switch 82 to close, thus deactivating the warning signal.

If sufficient pressure in the tank 12 cannot be re-established to hold a charge within the system, the warning light or warning signal will stay on alerting the operator to the potentially dangerous condition.

If the tank pressure and distribution system pressure are too low, the spring 74 will move the rod 60 to the left, thus permitting the reed switch 82 to close to deactivate the signal. To avoid the signal being shut off even though a dangerously low pressure exists in the tank, a ball and detent may be provided between the rod 60 and the bore or passage 56 in block 55 to hold the end portion 72 of the rod 60 in the circuit interrupting position between the magnet 80 and reed switch 82 against the action of the spring 74.

The modification of the invention shown in FIG. 3 operates in substantially the same manner except that as the rod 160 moves to the right, the magnet 190 is moved into operating position with respect to the reed or Hall switch 182 to close the switch, thereby energizing the warning signal until the equilibrium is again re-established. It will be noticed in FIG. 3 that there is no spring urging the rod 160 to the left. It has been found that equalizing the pressure in the distribution system 14 with the pressure in the tank 12 will permit the diaphragm 38 to expand so that the spring 164 will seat the valve 162 on the seat 168 to isolate the contents of the tank 12 from the distribution system 14.

The FIG. 4 modification alerts the operator by the rod 260 moving into the glass thimble 295 which causes the glass thimble to reflect the color of the end portion 272 of the rod 260 to visually warn the operator of the potentially dangerous condition.

Other aspects, objects and advantages of this invention can be obtained from a study of the drawings, the disclosure and the appended claims.

I claim:

1. A leak detection apparatus (18) for a pressurized system having a source of pressurized fluid (12) and a distribution system (14) having at least one outlet (100) for said pressurized fluid, said distribution system (14) being maintained under pressure approximately equal to the pressure of the pressurized fluid in said source comprising:
    means (38,138, 62,162) for sealing the source of pressurized fluid (12), said means (38,138, 62,162) including a movable member (62,162) seatable on a seat (68,168) positioned between said source of pressurized fluid and said distribution system (14);
    rod means (60,160,260) carried by said movable member (62,162) and being movable with said movable member (62,162); and
    means (82,182,295) operatively conditioned by movement of said movable member (62,162) and of said rod means (60,160,260) for signalling a pressure differential between said source of pressurized fluid (12) and said distribution system (14).

2. A leak detection apparatus (18) as claimed in claim 1 wherein said course of pressurized fluid is maintained in a tank (12), and wherein said means (38,138, 62,162) for sealing said source of pressurized fluid includes a diaphragm (38,138) sealed at one end to said tank (12) and sealable at its other end by said rod means (62,162).

3. A leak detection apparatus (18) as claimed in claim 2 wherein said means for sealing includes spring means (64,164) urging said movable member (62,162) against said seat (68,168), said seat (68,168) being on said other end of said diaphragm (38,138).

4. A leak detection apparatus (18) as claimed in claim 1 wherein said movable member is a cone-shaped valve (62).

5. A leak detection apparatus (18) as claimed in claim 1 wherein said movable member is a spherically-shaped ball-type valve (162).

6. A leak detection apparatus (18) as claimed in claim 1 wherein said means (82,182,295) activated by movement of said movable member (62,162), and of said rod means (60,160) is a reed switch (82,182) which is closed by a magnetic member (80,190) and wherein movement of said rod means (60,160) makes or breaks a circuit extending from said reed switch (82,182) to a signalling device for activating and deactivating said signalling device.

7. A leak detection apparatus (18) as claimed in claim 6 wherein said movement of said rod means (60) moves an end portion (72) between the reed switch (82) and the magnetic member (80) to break the circuit and to activate the signalling device.

8. A leak detection apparatus (18) as claimed in claim 6 wherein said movement of said rod means (160) moves the magnetic member (190) into position to complete a circuit with the reed switch (182) to activate the signalling device.

9. A leak detection apparatus (18) as claimed in claim 1 wherein said means (82,182,295) activated by movement of said movable member (162) and of said rod means (260) is an end portion (272) of said rod means (260) and a sight glass (295) in alignment with said end portion (272) of said rod means (260), said end portion (272) moving into said sight glass (295) in response to low fluid pressure in the distribution system (14) to warn of said low pressure in the distribution system (14).

10. The leak detection apparatus (18) as claimed in claim 9 wherein said end portion (272) of the rod means (260) carries a distinctive marking readily observable through said sight glass (295).

11. A leak detection apparatus (18) for a pressurized system having a tank (12) containing pressurized fluid and a distribution system (14) having at least one outlet (100) for said pressurized fluid, said distribution system (14) being maintained under pressure approximately equal to the pressure of the pressurized fluid in said tank comprising:
    a diaphragm (38,138) having two ends and being sealingly connected at one end to said tank (12), a valve (62,162) seating on the other end of said diaphragm (38,138);
    rod means (60,160) carried by said valve (62,162) and being movable with said valve (62,162); and
    switch means (82,182) activated by movement of said rod means (60,160) for signalling a pressure differential between said tank (12) and said distribution system (14).

12. A leak detection apparatus (18) as claimed in claim 11 wherein a valve seat (68,168) is formed on said other end of said diaphragm (38,138), and wherein spring means (64,164) urge said valve (62,162) against said valve seat (68,168) to seal the tank (12) from the distribution system (14).

13. A leak detection apparatus (18) as claimed in claim 11 wherein said switch means is a reed switch (82,182) and wherein movement of one end portion (72,190) of said rod means (60,160) in close proximity to said switch (82,182) changes the condition of said switch (82,182) to energize a signal to warn of low pressure on the distribution system (14).

14. A leak detection apparatus (18) as claimed in claim 13 wherein said movement of the one end portion (72) of said rod means (60) interrupts a circuit between a magnet (80) and the reed switch (82) to break the circuit to set off the signal.

15. A leak detection apparatus (18) as claimed in claim 13 wherein said movement of the one end portion of the rod means moves a magnet (190) into close proximity to a switch (182) to close a circuit and energize the warning signal.

* * * * *